(12) United States Patent
Charugundla

(10) Patent No.: US 9,031,210 B2
(45) Date of Patent: May 12, 2015

(54) DEVICE FOR NON-INTRUSIVE SCREENING OF TELEPHONE CALLS AND METHOD THEREOF

(71) Applicant: Kent S. Charugundla, New York, NY (US)

(72) Inventor: Kent S. Charugundla, New York, NY (US)

(73) Assignee: C21 Patents, LLC, New York, NY (US)

( * ) Notice: Subject to any disclaimer, the term of this patent is extended or adjusted under 35 U.S.C. 154(b) by 0 days.

(21) Appl. No.: 13/955,968

(22) Filed: Jul. 31, 2013

(65) Prior Publication Data

US 2015/0036808 A1 Feb. 5, 2015

(51) Int. Cl.
*H04M 1/64* (2006.01)
*H04M 3/436* (2006.01)

(52) U.S. Cl.
CPC ..................................... *H04M 3/436* (2013.01)

(58) Field of Classification Search
CPC .. H04M 3/533; H04M 2201/40; H04M 3/436
USPC ......... 379/88.24, 88.77, 88.01, 210.03, 88.22
See application file for complete search history.

(56) References Cited

U.S. PATENT DOCUMENTS 5,991,367 A * 11/1999 Robuck ...................... 379/88.24
2005/0123118 A1* 6/2005 Terry et al. ............... 379/211.02
2006/0040731 A1* 2/2006 Yamamoto et al. ............. 463/22

* cited by examiner

*Primary Examiner* — Simon King
(74) *Attorney, Agent, or Firm* — Paul J. Sutton; Barry G. Magidoff

(57) ABSTRACT

A telephone with a call screening device is able to screen automated calls by transmitting a message containing an instruction upon detecting an incoming call. The instruction from the call screening device requests that the calling party respond to the message correctly and in time before the call screening device allows the telephone to ring and the call answered. The instruction contains, inter alia, a string of randomly generated numbers that the calling party is asked to dial as part of his/her response. In the event that the response is not received in time or the response is incorrect, the call screening device terminates the call without the phone ever ringing.

9 Claims, 5 Drawing Sheets

DEVICE FOR NON-INTRUSIVE SCREENING OF TELEPHONE CALLS AND METHOD THEREOF

FIELD OF THE INVENTION

The present invention generally relates to the field of telecommunications. In particular, the present invention relates to a device and method for screening certain telephone calls in a manner that does not disturb the called party.

BACKGROUND

Numerous governmental rules and regulations have been created to protect consumers from receiving random calls from telemarketers, debt collecting companies or creditors. For example, debt collectors are typically limited to calling during a certain time period of a consumer's business day (e.g., business hours—9:00 am to 5 pm). Also, consumers are able to register and list their phone numbers on a "Do Not Call" list, which supposedly alerts telemarketers of the telephone numbers that they are not allowed to call. Despite the many rules and mechanisms that have been established to protect consumers from the onslaught of telephone calls daily, many consumers are still being annoyed by these calls.

A common technique used by consumers and many others who receive many annoying phone calls throughout each day is to screen the calls with answering machines. A consumer does not answer a phone call, but intentionally allows a connected answering machine to answer the call. After a few rings, the answering machine will answer the call with a brief message asking the calling party to leave a message. The person being called can then hear the message and, in many cases, is able to determine the identity of the caller. The consumer can then decide to answer the call or not. While this approach may be effective, it does not resolve annoyance and interruption of the consumer throughout the day. Even though the consumer is able to effectively screen out and not answer unwanted calls, he/she does so at the expense of being disturbed throughout the day by these types of phone calls Many of these calls are automatically performed by a computer that dials phone numbers automatically and upon getting a response from a called party, start to broadcast a previously recorded message to advertise a product, a service or to leave a message regarding some type of loan or payment on which the called party has defaulted. Creditors, and telemarketers are able to make much more of these types of phone calls using this method and thus many consumers are being bombarded with such calls. In many cases a consumer's answering machine can become full relatively quickly on any given day; this is a problem as the consumer may be unable to receive important messages.

Moreover, a consumer has no recourse to complain or register his/her displeasure at the time of the call; this is because the calling party is actually a machine and not a human to whom one can convey his/her objections at the time of the call. These automated calls are most problematic because it is hard to trace them and identify the entity responsible for such calls. Often the parties on whose behalf the calls are made rely on third or even fourth parties to make these calls. A consumer who reports these calls to the authorities soon realizes that it is quite easy for the calling party to change their phone numbers and continue to make such calls, which can at best be characterized as annoying and at worst as harassing.

SUMMARY

The present invention provides a device and method for screening calls and terminating such calls when they are deemed to be automated calls. The communication device may be installed in a telephone (i.e., POTS, PSTN or IP telephone); that is, it can be part of a communication switch or equipment to which telephones are coupled or it can be a separate device in communication with a communication switch. The device, referred herein as a call screening device, comprises a random number generator, and a microprocessor in communication with the random number generator where the microprocessor causes a message to be transmitted in response to a received ring signal of an incoming call to the communication equipment. The message comprises at least an N-digit string of numbers generated by the random number generator where N is an integer equal to 2 or greater. When a response to the message is received, the microprocessor does not allow the ring signal to be received by the communication equipment and terminates the call if such response either does not contain at least signals representing the random numbers having been dialed or the response was not received within a defined period of time.

The method of the present invention provides the steps of detecting an incoming call including the ring signal associated with the incoming call. If the detected incoming call is from a known or acceptable calling party, the ring signal is allowed to be received by the communication equipment and the call is processed as per the protocol being followed by the communication equipment. If, however, the calling party is not recognized, then the ring signal is intercepted and an N-digit string of numbers is randomly generated where N is equal to 2 or greater. Further, a message is generated and transmitted to the calling party instructing the calling party to perform a certain task at least involving dialing the randomly generated numbers within a defined period of time. If the response to the transmitted message is in compliance with the instructions in the transmitted message and is received in a timely manner, the incoming ring signal is allowed to be received by the communication equipment, and the call is allowed to be processed by the communication equipment in accordance with the one or more protocols being followed. If, however, the response does not comply with the instructions in the transmitted message and/or the response is not timely, the ring signal is not allowed to be received by the communication equipment and the call is terminated.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

The present invention provides a device and method for screening calls and terminating such calls when they are deemed to be automated calls. The communication device may be installed in a telephone (i.e., POTS (Plain Old Telephone Service), PSTN (Public Switched Telephone Network) or IP (Internet Protocol) telephone); that is, it can be part of a communication switch or equipment to which telephones are coupled or it can be a separate device in communication with a communication switch. The device—referred herein as a call screening device—comprises a random number generator; and a microprocessor in communication with the random number generator where the microprocessor causes a message to be transmitted in response to a received ring signal of a call to the communication equipment. The message comprises at least an N-digit string of numbers randomly generated by the random number generator, where N is an integer equal to 2 or greater. When a response to the message is received, the microprocessor does not allow the ring signal to be received by the communication equipment and terminates the call if such response either does not contain at least signals representing the random numbers having been dialed or the response was not received within a defined time period.

The method of the present invention provides the steps of detecting an incoming call including the ring signal associated with the incoming call. If the detected incoming call is from a known or acceptable calling party, the ring signal is allowed to be received by the communication equipment and the call is processed as per the protocol being followed by the communication equipment. If, however, the calling party is not recognized, then the ring signal is intercepted and an N-digit string of numbers is randomly generated where N is an integer equal to 2 or greater. Further, a message is generated and transmitted to the calling party instructing the calling party to perform a certain task at least involving dialing the randomly generated numbers within a defined period of time. If the response to the transmitted message is in compliance with the instructions of the transmitted message and is received in a timely manner, the incoming ring signal is allowed to be received by the communication equipment, and the call is allowed to be processed by the communication equipment in accordance with the one or more protocols being followed. If, however, the response does not comply with the instructions in the transmitted message and/or the response is not timely, the ring signal is not allowed to be received by the communication equipment and the call is terminated. In sum, if the call is not from a human, the ring signal does not get processed and thus the called party's telephone does not ring avoiding that party from being disturbed by an automated call.

Figure 1:
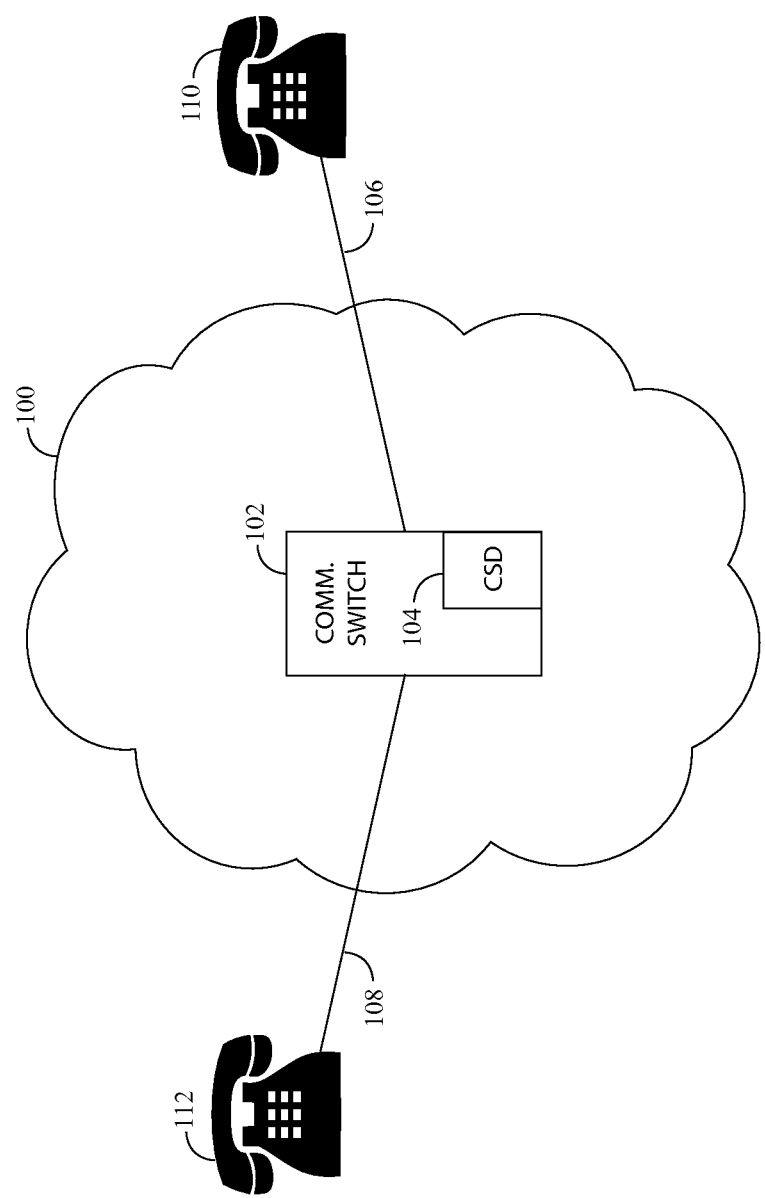
FIG. 1 is a block diagram of a communication system with the device of the present invention integrated in communication equipment of the communication system.

Referring to FIG. 1, there is shown a block diagram of a communication system that is part of a communication network 100. The communication system comprises communication equipment 102, which may be a communication switch, for example, and embedded therein (or integrated with) a Call Screening Device (CSD) 104 of the device of the present invention. The communication system is shown having the communication switch (including the CSD 104) coupled to a calling party telephone 110 via communication link 106 and coupled to the called party telephone 112 via communication link 108. The communication links 106 and 108 may be implemented as one or more communication paths and equipment connected to each other to form a virtual and/or a physical communication channel allowing information to be exchanged between communication equipment 102 and telephones 110 and 112 respectively. The term "couple" or "couple(d) to" as used herein refers to a path or a series of connected paths (permanent or temporary) that allows information (in one or more formats) or signals to flow from one point or equipment in a communication network to another point within the same equipment or another equipment in the same or different communication network in accordance with the protocol(s) of the communication network(s).

It will be noted that communication switch 102 may represent various types of communication equipment coupled to each other to perform various processing functions that support and help effectuate the processing, transmission and reception of signals between the two telephones 110 and 112. It will also be noted that the communication system shown in FIG. 1, may comprise more than two telephones coupled to communication equipment 102; FIG. 1 is limited to telephones 110 and 112 for ease of discussion and explanation. It will be understood, however, that the communication system of FIG. 1 may have communication equipment 102 that services more than two telephones at any particular time. For ease of explanation the operation of CSD 104 will be discussed in the context of telephone 110 calling telephone 112 both of which are part of communication network 100 or are coupled to communication network 100.

Figure 2:
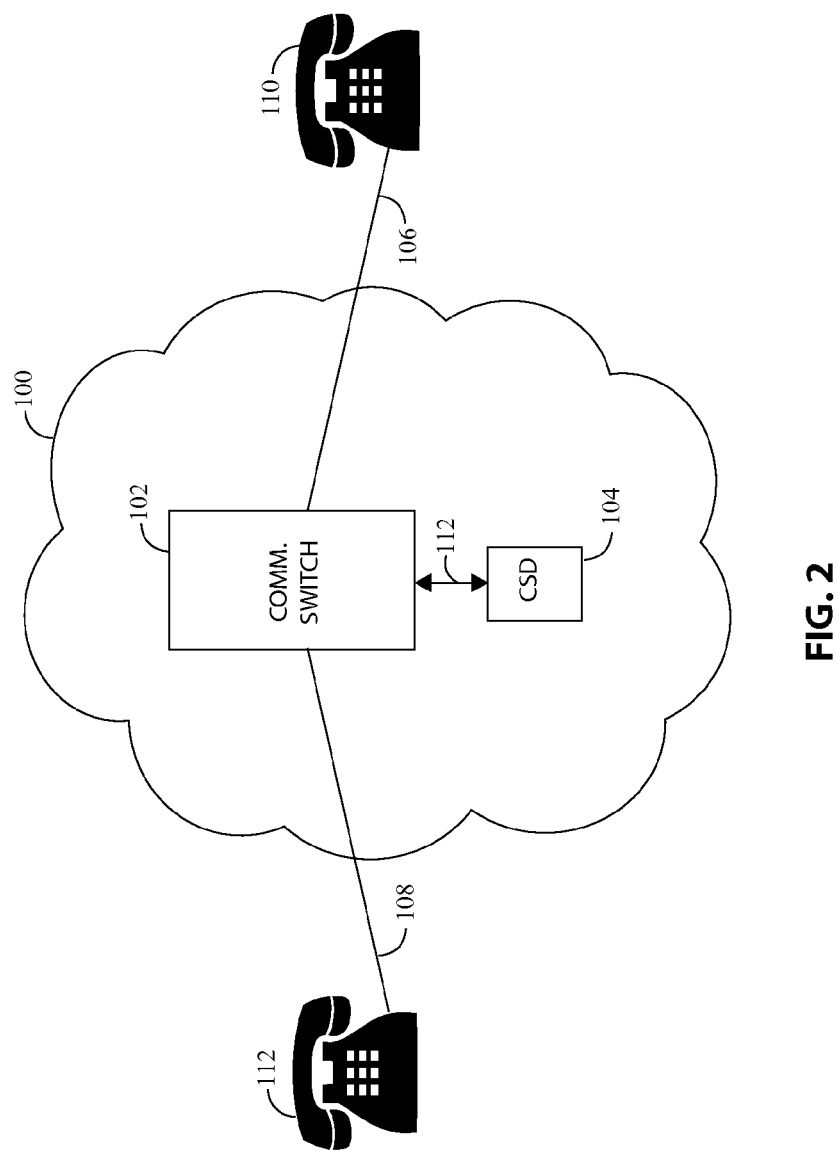
FIG. 2 is the block diagram of FIG. 1 where the device of the present invention is in communication with the communication equipment.

Referring now to FIG. 2, there is shown a system where CSD 104 is in communication with communication equipment 102 (e.g., a communication switch). CSD 104 in FIG. 2 operates in much the same manner as in FIG. 1. It will be understood, however, that CSD 104 of FIG. 2 may not be necessarily co-located with communication equipment 102. Communication link 112, which may be a relatively wide bandwidth communication link, couples CSD 104 to communication equipment 102; that is, CSD 104 may not be proximate to communication equipment 102 and may, in fact, be located miles away from communication equipment 102. Information can then be exchanged between CSD 104 and communication switch 102 to allow CSD 104 to operate as per the device of the present invention and in accordance with the method of the present invention.

Figure 3:
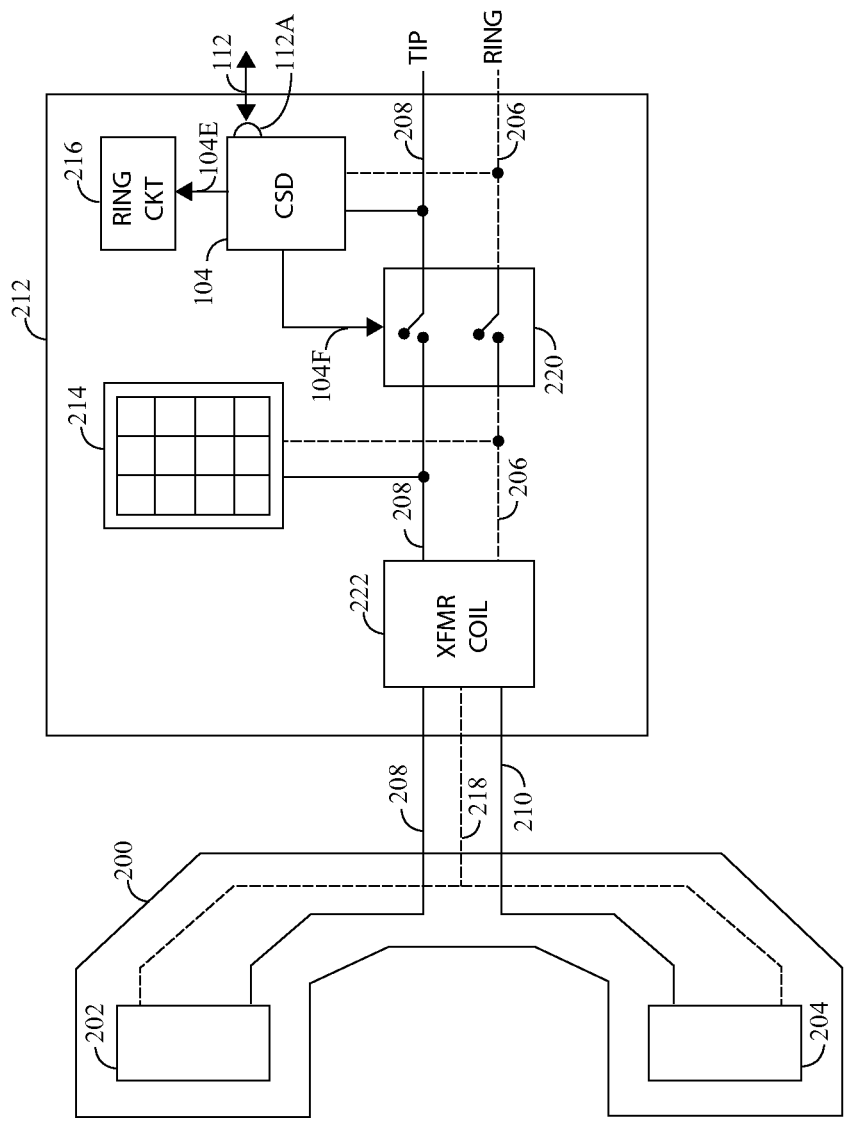
FIG. 3 is shows the device of the present invention integrated into a telephone.

Referring to FIG. 3, there is shown CSD 104 integrated within a telephone that can be used in a POTS, PSTN communication system. An incoming ring signal of an incoming call is intercepted by CSD 104 which processes such signal and also processes caller id information to determine whether to transfer the ring signal to ring circuit 216 and allow hook switch 220 to close to have the called properly handled in accordance with a protocol being followed. Unlike in FIG. 2, CSD 104 is not connected to a communication switch via communication link 112; the port 112A to which communication link 112 would be connected or the port 112A that is dedicated to communication link 112 is not connected to any equipment or device. The port of CSD 104 usually connected to communication link 112 is depicted as not being connected to any equipment because this link is designed for connection to communication equipment such as a communication switch (102; see FIGS. 1 and 2). When CSD 104 is integrated within a standard analog telephone, communication link 112 is not used. However, CSD 104 will operate in virtually the same manner as described with respect to FIGS. 1 and 2.

The telephone of FIG. 3 is a device that would be typically used in POTS or PSTN systems. Continuing with the telephone of FIG. 3, the telephone uses a two-wire system commonly known as tip/ring wires (color coded where the tip wire is green and the ring wire is red). The ring wire has a negative DC (Direct Current) voltage and the tip wire has a voltage set at earth ground (i.e. zero volt). At the input to the telephone, the CSD 104 is connected across the tip wire 208 and ring wire 206 (shown as a dashed line). A hook switch 220 is connected in series with the tip and ring wires (208, 206) respectively as shown. The ring circuit 216 is connected to CSD 104 via connective path (or connection) 104E, all of which are connected to the input side of the hook switch 220.

On the other side of the hook switch 220 a dialer 214 is connected across the tip ring wires as shown followed by coil 222 that performs two functions.

First, the coil 222 makes two wire operation possible in that both voice signals originating from the microphone 204 and voice signals being received by speaker 202 use the same wires. Coil 222 and associated components (not shown) are able to route microphone voice signals through the hook switch 220 (assuming it is in the closed position) and onto the POTS network (or PSTN) while routing incoming voice signals to the speaker 202. Second, coil 222 serves to significantly attenuate voice signals from microphone 204 before they reach speaker 202 while allowing such voice signals to pass onto the network (e.g., POTS or PSTN). The conductors 206 and 218 representing the ring wire are shown in dashed lines for ease of reference.

Figure 4:
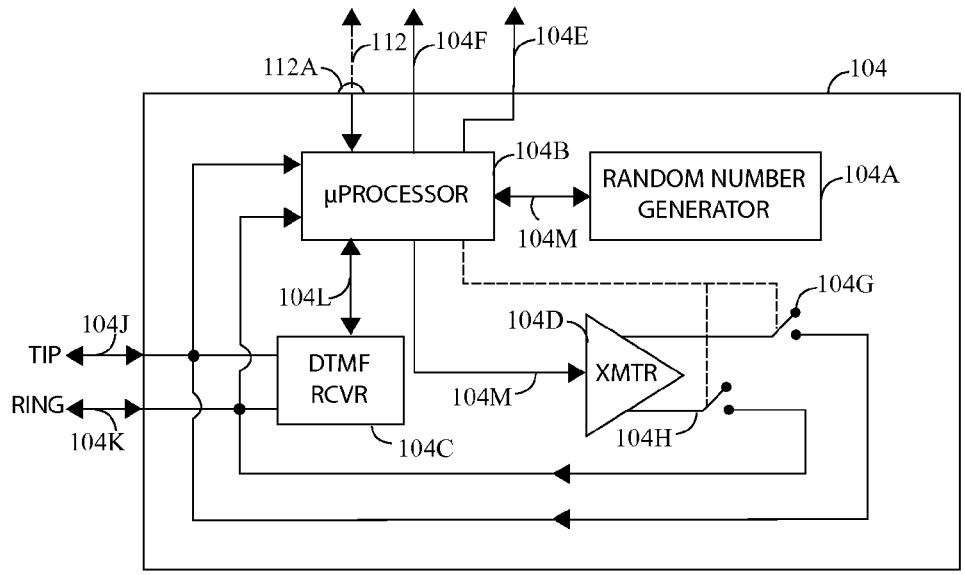
FIG. 4 is a block diagram of the device of the present invention.

Referring now to FIG. 4, a block diagram of CSD 104 is shown. In the embodiment shown, CSD 104 comprises differential DTMF (Dual Tone Multi Frequency) receiver 104C (also used as a regular receiver to receive voice signals and other signals in addition to dual tone signals), microprocessor 104B, random number generator (RNG) 104A, and differential transmitter 104D. Although not shown, microprocessor 104B also contains a digital transmitter and digital receiver. Microprocessor 104B has an input/output port 112A to which communication link 112 can be connected (see FIG. 2). Communication link 112 is not connected to CSD 104 in FIG. 4, but is shown in dashed lines signifying that it would be connected to port 112A (see FIG. 2) when CSD 104 is interfaced to communication switch 102 of FIG. 2 or other similar communication equipment. Microprocessor 104 has emanating therefrom control line 104F and control line 104E used respectively to control hook switch 220 and Ring circuit 216 (see FIG. 3). Signals carried by Tip/Ring conducting paths 104J and 104K are applied to the input of DTMF receiver 104C and microprocessor 104B (via an interface circuit including an Analog to Digital circuit—not shown).

Microprocessor 104B may generate messages in analog and/or digital form (e.g., synthesized voice, text, or other types of signals) and transmit such messages via the port 112A for connection to communication link 112 or via path 104M through transmitter 104D, through closed switches 104G and 104H and onto paths 104J and 104K. Note that switches 104G and 104H are controlled by microprocessor 104B via the control lines shown as dashed lines. Microprocessor 104B can retrieve dialed number information from DTMF receiver 104C and can also control the overall operation of DTMF receiver 104C including deactivating DTMF receiver 104C. DTMF receiver 104C is used to receive and detect numbers (transmitted as dual tone signals) dialed by a calling party to determine if the randomly generated string of numbers in the transmitted message are part of the response from the calling party. Microprocessor 104B exchanges information with DTMF receiver 104C and controls the overall operation of DTMF receiver 104C via path 104L. DTMF receiver 104C may have additional receivers for receiving other types of analog signals (e.g., voice signals). It will be understood therefore that, based on the above description of CSD 104 of FIG. 4, such a device is applicable to digital and/or analog networks and can be used in connection with or engage standard analog telephones, digital telephones, and telephones with text capabilities; thus CSD 104 can be used with IP telephones (telephones operated as per the Internet Protocol) and other digital telephones. Also, CSD 104 can be used in POTS and PSTN and other analog networks. Further, CSD 104 can be used in digital networks such as the Internet.

Further, when CSD 104 is used in connection with the Internet, a digital transmitter (within microprocessor 104B; not shown) is used to transmit data and a digital receiver (within microprocessor 104B; not shown) is used to receive data. Microprocessor 104B controls random number generator 104A via path 104M to (i) command RNG 104A to generate an N-digit string of numbers and (ii) obtain said N-number string of numbers from RNG 104A and confirm that the previously generated N-digit string has not been replicated. RNG 104A may also contain circuitry that prevent it from generating consecutive duplicate N-digit strings. Microprocessor 104B also uses path 104M to obtain from RNG 104A the generated N-digit string of numbers; N is an integer equal to 2 or greater.

Figure 5:
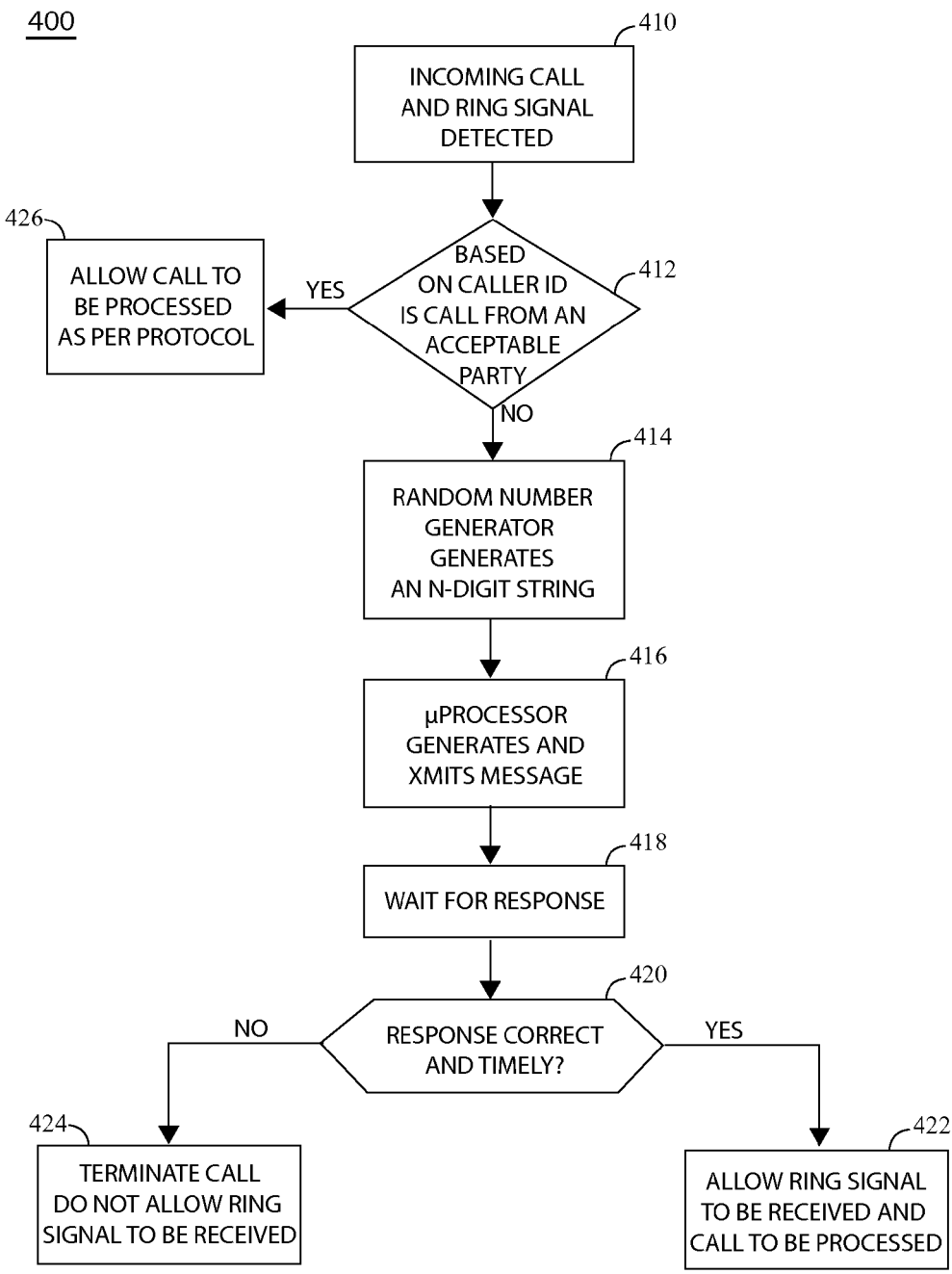
FIG. 5 is a flow chart showing the method of the present invention.

The CSD 104 of the present invention has been described above in the context of (i) being part of a communication equipment (see FIG. 1); (ii) being in communication with a communication equipment (see FIG. 2) and (iii) being part of a telephone (see FIG. 3). An embodiment of CSD 104 is depicted in FIG. 4 and such an embodiment is described as having the capability of operating within a digital network (e.g., Internet) or analog networks (e.g., POTS and PSTN). That is, CSD 104 can be used with standard telephones or IP phones. The operation of CSD 104 in accordance with the method of the present invention as depicted in FIG. 5 will now be discussed.

In step 410, an incoming call has been initiated and a ring signal is detected. In addition to the ring signal, caller id information (i.e., telephone number of the calling party) is also typically available. The ring signal is intercepted and an assessment of the caller id information is performed by CSD 104 to determine if the call is to be allowed or if the call should be terminated. The caller id information provides, inter alia, the telephone number of the calling party. CSD 104 may then confirm whether the telephone number of the calling party matches a number from a list of numbers (and corresponding names) associated with the called telephone and deemed acceptable numbers. If the calling party's telephone number is deemed an acceptable telephone number, then the ring signal is allowed to pass through and the telephone call is processed as per the protocol(s) being followed by the communication equipment and/or the called telephone. An acceptable telephone number is a telephone number of a person known by the owner/operator of the called telephone and is on the list accessible to microprocessor 104B of CSD 104. Also, CSD 104, may be programmed not to monitor calls during certain hours of a weekday. Say, for example, during business hours (9:00 am to 5 pm), CSD 104 may be deactivated and thus all calls will be processed by the communication equipment 102 and/or by the called telephone as per the protocol being followed by the communication system within which the telephone resides.

Therefore, in step 412, if the call is from an acceptable party (i.e., a party whose number appears on the list of acceptable calling parties), the method of the present invention moves to step 426 and processes the call as per the protocol being followed. For the systems of FIGS. 1 and 2, the CSD 104 allows communication equipment 102 to process the telephone as per the protocol(s) being followed by communication network 100.

For FIGS. 1 and 2 communication network 100 and the communication equipment coupled thereto (e.g., communication equipment 102, telephones 110 and 112, and communication links 106 and 112) may be constructed and operated in accordance with a communication standard having various communication protocols that are followed in order to properly operate the equipment that form part of communication network 100. A communication standard comprises a set of rules and regulations established by technology based organizations, governmental bodies, or a consortium of business organizations that dictate the operation of devices and systems within a communication network. The rules and regulations also control the constitution and characteristics of signals used for communication between two or more distinct communication equipment. Generally, a protocol is an established procedure or a set of well-established procedures that is part of a communication standard. A communication protocol, for example, may dictate how two or more communication equipment initiate communication with each other within a communication network or system and maintain communication in a manner that complies with a communication standard.

Continuing with the method of the present invention, if the call is not from an acceptable party or the call is originated during off business hours, then the method of the present invention moves to step 414.

In step 414 microprocessor 104B instructs random number generator 104A, via path 104M, to randomly generate a N-digit string of numbers where N is an integer equal to 2 or greater. Microprocessor 104B then obtains (via path 104M) the generated N-digit string and the method of the present moves to step 416. RNG 104A has circuitry that is designed to avoid the generation of consecutive duplicate strings of numbers and to confirm that the N-digit string of numbers is not the same as the previous N-digit string of numbers.

In step 416, microprocessor generates a message or obtains a pre-formed message at least part of which contains the N-digit string of numbers randomly generated by random number generator 104A. The message may contain an instruction at least involving dialing the N-digit string of numbers. For example, the message may be the following: "Hello, you have reached the number [ . . . (INSERT) . . . ], please state your name clearly and dial the following numbers . . . [ . . . (INSERT) . . . ] followed by the [ . . . (INSERT) . . . ] sign." The first insert would include the telephone number; the second insert would include the actual string of numbers obtained from the random number generator and the third insert would include a symbol such as the pound sign (#). The transmitted message may be synthesized through the use of speech synthesis or speech synthesizer software/hardware or it may be a pre-recorded message with the N-digit string of numbers injected into each new message. The transmitted message may also be a text message. For an IP phone, the message is transmitted from port 112A over communication link 112. For an analog phone such as the one depicted in FIG. 3, the message is generated by microprocessor 104B. The microprocessor then closes switches 104G and 104H and applies the message to the input of differential transmitter 104D which transmits the message over paths 104J and 104K to the calling party. It will be readily obvious that variations of the message can be used to instruct the calling party as to how to respond. The purpose of the message is to eliminate the automated calls. The machines or computer with which such calls are made would be unable to follow the instructions of the messages generated by microprocessor 104B. Various methods can be used to generate the message. However such a message is preferably generated in the form of one or more instructions that are transmitted to the calling party.

In step 418, microprocessor 104B of CSD 104 waits for a response to the instructions included in the transmitted message. If the response is not received within a defined period of time preset by microprocessor 104B, then the call is terminated. It should be noted that an operator or user of a telephone having the CSD of the present invention installed therein, may also be able to preset the defined period of time through operation or activation of a component of the telephone that interfaces with the microprocessor 104B of the CSD. For example, the dial pad 214 of FIG. 3 (e.g., dial pad is able to communicate with microprocessor 104B of CSC 104) can be used in conjunction with a procedure established by the manufacturer of the telephone to set the defined period of time. Further, a user of the systems of FIGS. 1 and 2 may set the defined period of time by contacting the service provider of those systems. A proper response, for the above described transmitted message, would at least include the dialing of the N-digit string of randomly generated numbers that were part of the transmitted message; presumably an operator of the called telephone would have performed the dialing task. If the response to the message is timely, but not correct, the call is also terminated. An incorrect response, may for example, be where the dialed numbers do not match the numbers of the N-digit string of numbers contained in the transmitted message. Upon transmission of the message, if a response is not received within the defined period of time or if the response is not correct, then the method of the present invention moves to step 424.

In step 424, the response (if any) has been deemed or determined to be incorrect or untimely or both. The ring signal is not allowed to be received by the called telephone, and the call is terminated by CSD 104. Termination of the call may be achieved by not answering the call; that is, the hook switch 220 of FIG. 3, for example, is never closed. Alternatively, the hook switch 220 may be temporarily closed and then opened which has the effect of "hanging up" on the caller. The transmitted message contains instructions to the calling party on how to respond to the message; the response at least involves the dialing of the randomly generated numbers. For example, suppose telephone 110 (of FIGS. 1 and 2) is calling telephone 112. Suppose further, that telephone 112 is constituted as shown in FIG. 3. Upon detecting the incoming call and the ring signal, CSD 104 intercepts the ring signals and does not allow it to be received by ring circuit 216; that is, the telephone does not ring. After transmitting the message described in step 416 above and after having received a response prior to the expiration of the defined time period, the CSD 104 receives and processes receives the response. If the response, including the dialed digits, is determined by microprocessor 104B to be correct, then the method of the present invention moves to step 422.

In step 422, the ring signal is allowed to be processed; that is, it is allowed to pass through to ring circuit 216 causing the telephone to ring. An operator of the telephone may answer the telephone causing hook switch 220 to close and thus the call is allowed to be completed.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

What is claimed is:

1. A call screening device coupled to communication equipment, the device comprising:
   a random number generator; and
   a microprocessor in communication with the random number generator causing a message to be transmitted in response to a received ring signal of a call to the communication equipment where the message comprises at least an N-digit string of numbers newly generated by the random number generator, where N is an integer equal to 2 or greater, said newly generated string of numbers being different from an immediately previous generated N-digit string of numbers and when a response to the message is received within a defined period of time, the microprocessor does not allow the ring signal to be received by the communication equipment and terminates the call if the response does not contain at least signals of the randomly generated numbers.

2. The call screening device of claim 1 further comprising a DTMF receiver circuit in communication with the microprocessor where said DTMF receiver circuit detects the ring signal and processes at least part of the response allowing the microprocessor to determine whether the numbers generated by the random number generator and which were part of the transmitted message are part of the response as dialed numbers.

3. The call screening device of claim 1 further comprising a transmitter circuit coupled to the microprocessor where said transmitter circuit is used to transmit the message.

4. The call screening device of claim 1 where the message further comprises instructions generated by the microprocessor requiring a response in which the N-digit string of numbers contained in the message are dialed as part of the response to the message.

5. The call screening device of claim 1 whereupon the DTMF receiver and the microprocessor detecting, in the response, dialed numbers equaling the numbers generated by the random number generator and which were part of the transmitted message, the ring signal is transferred to the communication equipment and allow the call to be established in accordance with one or more protocols being followed by the communication equipment.

6. The call screening device of claim 1 where the communication equipment is an IP telephone.

7. The call screening device of claim 1 where the communication equipment is a POTS telephone.

8. The call screening device of claim 1 where the communication equipment is a PSTN telephone.

9. The call screening device of claim 1 where the communication equipment is a communication switch coupled to one or more telephones that are part of one of a POTS, a PSTN and the Internet communication network.

* * * * *